United States Patent [19]
Mayes

[11] Patent Number: 5,771,500
[45] Date of Patent: Jun. 30, 1998

[54] HEADBAND WITH LENS PIECE

[76] Inventor: Mervin L. Mayes, 157-10 Riverside Dr. W.—Apt. 16-0, New York, N.Y. 10032

[21] Appl. No.: 416,648

[22] Filed: Apr. 5, 1995

[51] Int. Cl.[6] ........................................... A61F 9/02
[52] U.S. Cl. .................................. 2/452; 351/155; 2/918
[58] Field of Search ................................ 2/452, 10, 918, 2/DIG. 11, 441, 443, 13, 15; 351/155, 156, 157, 158; 128/858

[56] References Cited

U.S. PATENT DOCUMENTS

| | | | |
|---|---|---|---|
| 2,212,596 | 8/1940 | Fuller | 2/13 X |
| 4,152,051 | 5/1979 | Van Tiem et al. | 351/155 X |
| 4,176,410 | 12/1979 | Matthias | 2/436 |
| 4,520,510 | 6/1985 | Daigle | 2/454 |
| 4,616,367 | 10/1986 | Jean, Jr. et al. | 351/155 X |
| 4,712,254 | 12/1987 | Daigle | 2/DIG. 11 X |
| 4,781,451 | 11/1988 | McAllen | 351/155 X |
| 4,852,189 | 8/1989 | Duggan | 2/452 |
| 5,129,106 | 7/1992 | Liou | 2/DIG. 11 X |
| 5,309,577 | 5/1994 | Buononato et al. | 2/452 |
| 5,329,592 | 7/1994 | Altman | 2/DIG. 11 X |
| 5,339,119 | 8/1994 | Gardner | 351/155 X |

FOREIGN PATENT DOCUMENTS 1319413  1/1963  France  ........................................ 2/13

*Primary Examiner*—Peter Nerbun

[57] ABSTRACT

A headband (16) with lens piece (18) to be worn as a pair of eyeglasses is disclosed. Incorporated within the headband (16) are a pair of cutouts (24) and a retainer pocket (20) for insertion and retention of a lens piece (18). Lens piece (18) comprises a pair of eyeglasses with temple pieces (54) removed. A fabric section (30) with a pair of cutouts (24) is attached to the bottom edge of the headband (16) forming the retainer pocket (20). The section (30) is folded up and attached to the inner surface of the headband (16) with a two-part releasably cooperating fastener (22). Upon insertion of the lens piece (18), the cutouts (24) on the bottom edges of the headband (16) and fabric section (30) allow the lens piece (18) to pass through. When the retainer pocket (20) is closed the lens piece (18) is securely in position. The headband (16) encircles the head (14) of the wearer and fastens adjustably with releasably cooperating fastener (22). A second embodiment provides a tunnel (46) on each side of the inner surface of the headband (16) to keep each temple piece (54) in place when wearing conventional eyewear (56).

20 Claims, 8 Drawing Sheets

HEADBAND WITH LENS PIECE

BACKGROUND

1. Field of Invention

The present invention relates to a headband containing the frame and lens of a pair of eyeglasses, more specifically, to a headband that contains a retainer pocket to allow interchanging a lens piece or a pair of conventional eyewear.

2. Description of Prior Art

It is well recognized that many individuals wear eyeglasses, both prescription glasses and glasses that function solely as sunglasses. In recent years, the wearing of headbands has become highly popular as fashionable articles of ornamentation and for practicality in retaining the hair and absorbing perspiration.

Eyewear consumers experience difficulty and annoyance with maintaining stability on the face, particularly while engaging in physical activity. Complaints of excessive weight, pressure, irritation, indentations, and marks on the bridge of the nose and around the ears are well recognized. As a result, constant readjustment becomes the norm. The ultimate experience is the frequency of loose hinge screws, causing poor fit, discomfort, further instability, breakage and/or eventual loss of temple pieces. This renders the eyewear useless. In addition, many people feel that eyeglasses are unattractive and unstylish.

In response to the aforementioned objections to conventional eye wear, devices for various eyeglass and sunglass retainers that hold spectacles around the head have been advanced. The closest prior art to the instant invention of which the applicant is aware is disclosed in U.S. patents to Matthias U.S. Pat. No. 4,176,410 (1979), Daigle U.S. Pat. No. 4,520,510 (1985), Jean, Jr. et al U.S. Pat. No. 4,616,367 (1986), Daigle U.S. Pat. No. 4,712,254 (1987), and Duggan U.S. Pat. No 4,852,189 (1989). While these references disclose a variety of lens and goggle constructions embodied with headbands they clearly do not suggest the novel structural features of the instant invention.

The aforementioned prior art have developed headbands that would allow the device to function as a pair of eyeglasses, however they are constructed by incorporating specially designed lens elements (Jean, Jr. et al), goggles (Duggan), retractable, flexible sunshields (Daigle 1987 & Matthias), and eyepieces (Daigle 1985) which require complex and specialized support attachments, fasteners or construction to the headband. Any loss or breakage of the lens structure in these devices would be difficult to replace, and render them useless for their primary function. These devices have worked well for the purpose intended, but none have been satisfactory in addressing the aforementioned complaints in their entirety.

OBJECTS, FEATURES AND ADVANTAGES

It is therefore the object of the present invention to address the aforementioned complaints by providing a versatile and stylish headband with a unique, innovative and improved device for retaining a sunglass lens piece or a pair of conventional eyewear.

A further object of the invention is to provide a device to use previously owned lenses with broken or lost temple pieces.

Another object of the present invention is to provide a headband that offers a method for interchanging lens pieces and eyeglasses.

Yet another object of the present invention is to provide an innovative, attractive, and easy to use alternative for wearing eyeglasses.

Another object of the invention is to allow greater latitude in choice of lens pieces and eyeglasses.

Yet a further object is to provide a headband that is comfortable, stable, washable, and functional, suitable for a wide range of activities at any time.

An advantage is adjustability of size.

An additional advantage is economical for the ability to recycle and reactivate glasses with or without temple pieces.

Still another advantage minimizes loss. By lowering the band around the neck or pushing glasses on top of forehead, headband and glasses remain with the wearer when not in use. And further still another advantage is the provision of a headband having a two-part releasably cooperating fastener that provides sure, adjustable, quick release fastening even during strenuous activity.

Further objects, features, and advantages of my headband with lens piece will become apparent from a consideration of the following description and accompanying drawings of the presently preferred embodiments of the invention.

DRAWING FIGURES

Figure 1:
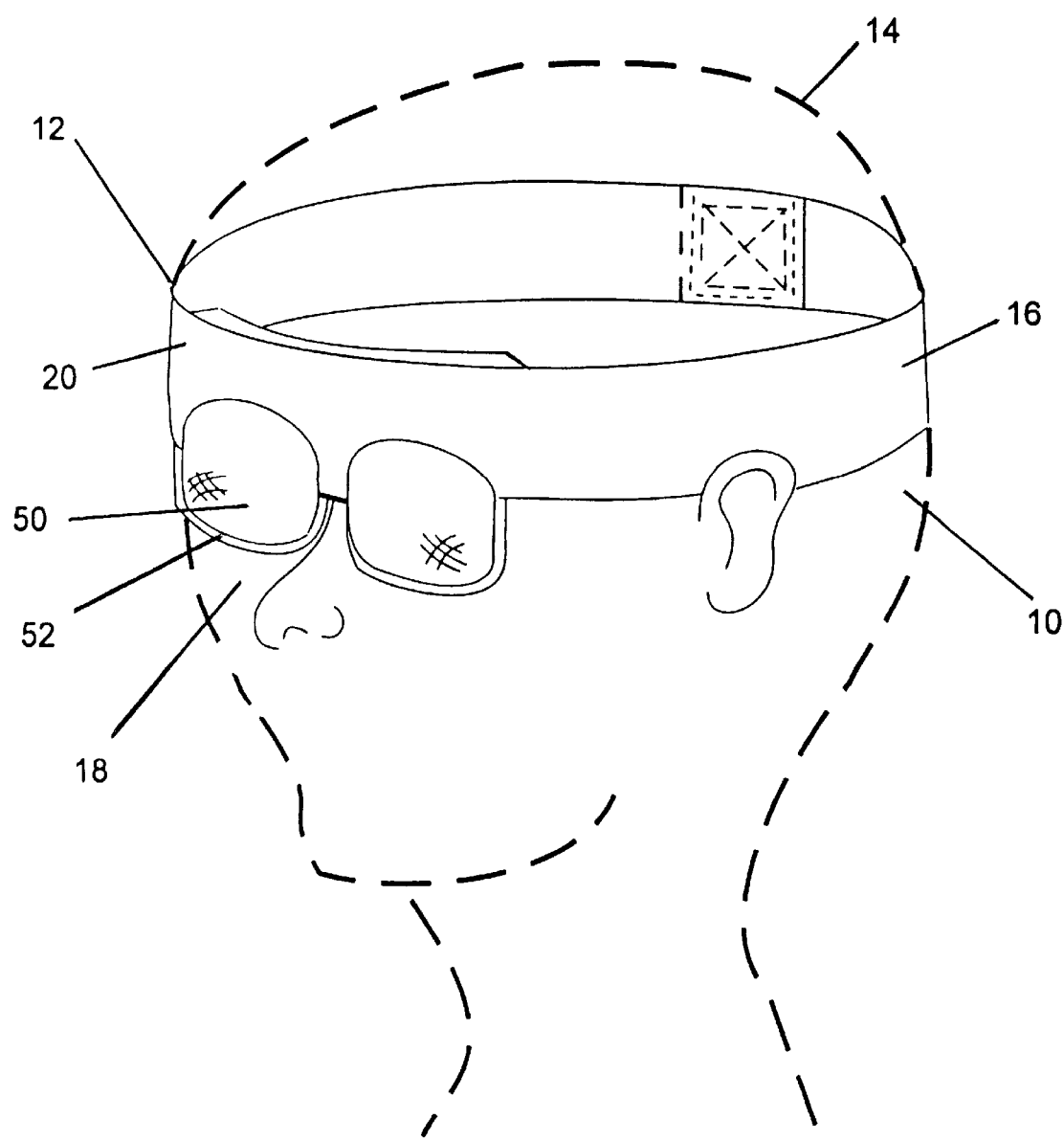
FIG. 1 is an illustration showing the present headband with lens pieces inserted in a retainer pocket in place on the face and around head of the wearer.

REFERENCE NUMERALS IN DRAWINGS 10 article
12 forehead
14 head
16 headband
18 lens piece
20 retainer pocket
22 two-part releasably cooperating fastener
24 pair of cutouts
26 opening
28 fabric
30 section
34 moisture absorbing material strip
36 opening
38 openings A, B, C
40 lining
42 tabs A, B, C
44 pair of openings
46 tunnel
48 extension
50 lens elements
52 peripheral rims
54 temple piece
56 conventional eyewear

DESCRIPTION—FIGS. 1 to 7

A typical embodiment of the headband with lens piece is illustrated in FIG. 1. The general article 10, is shown in place on the forehead 12 encircling the head 14 of the wearer. Article 10 is adapted to include a headband 16 and a lens piece 18 held in place with a retainer pocket 20 to be worn as a pair of eyeglasses. Lens piece 18 is fully supported by band 16 and pocket 20 so that they do not rest on the wearer's nose. Lens piece 18 is preferably embodied as a conventional pair of eyeglasses with each temple piece 54 removed. Lens piece 18 comprises a pair of clear or colored transparent lens elements 50 preferably constructed of an at least partially flexible plastic material that can have peripheral rims 52 made of rigid material such as plastic, or metal. Article 10 is attractive and functional, susceptible to widespread usage by a wide range of people.

Figure 2:
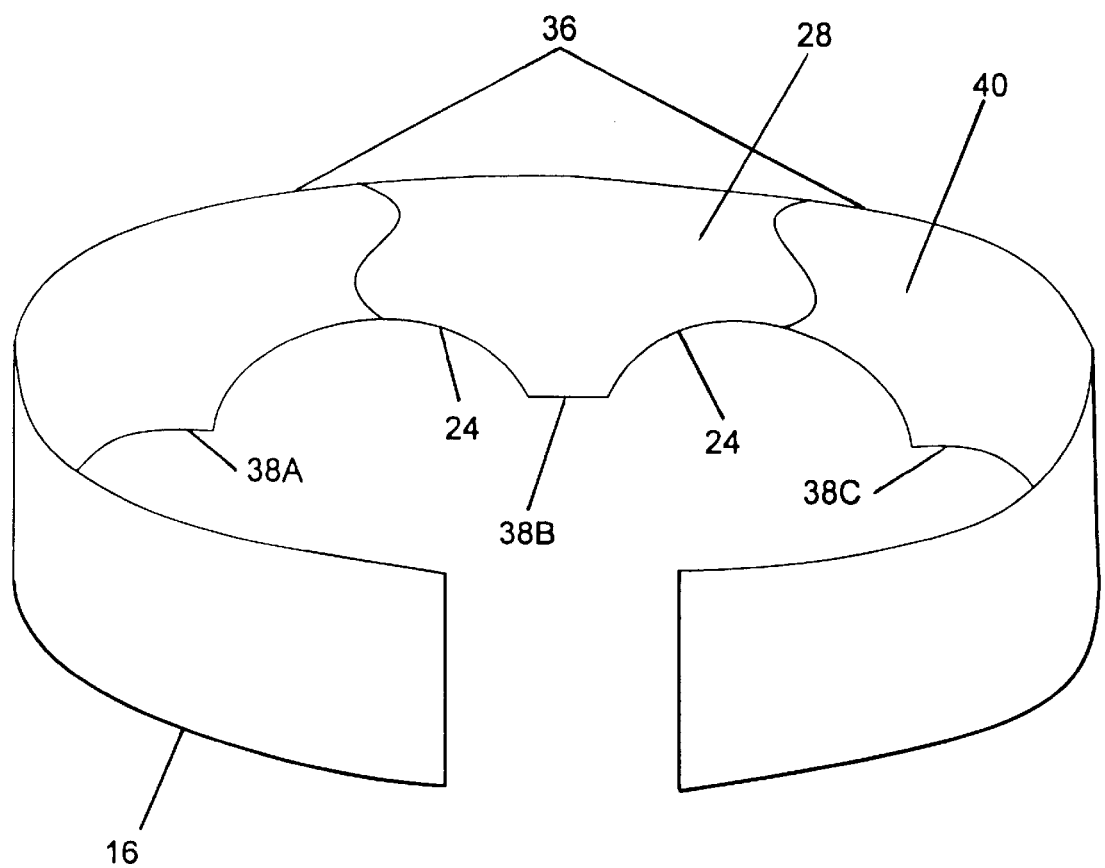
FIG. 2 is a rear perspective view of a headband.

Referring to FIG. 2, the construction of article 10 is more clearly illustrated. Band 16 is preferably formed from an elongated flexible band of fabric 28 and a similarly shaped lining 40. A pair of cutouts 24 are cut from the bottom edge of both fabric 28 and lining 40. With right sides together, fabric 28 is joined around edges as by sewing to lining 40 leaving no less than a ¼" opening at points 38A, 38B, 38C on the bottom edge. An opening 36 is left across the top edge of band 16 at least the length of cutouts 24.

Figure 2A:
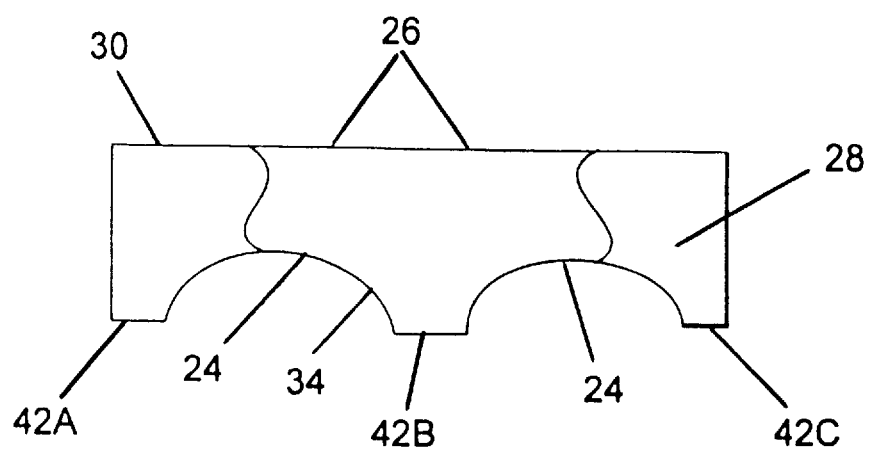
FIG. 2A is a front elevation of section.

Referring to FIG. 2A, the construction of pocket 20 is preferably formed from a section 30 made from a short flexible band of fabric 28 and a similarly shaped moisture-absorbing material strip 34. Cutouts 24 are cut from bottom edge of both section 30 and strip 34; forming three tabs 42A, 42B, 42C. With right sides together, fabric 28 is joined around edges as by sewing, except at tabs 42A, B, C, to strip 34. An opening 26 no less than 3" is left across the middle at the top edge of joined fabric 28 and strip 34. Section 30 is formed by bringing right sides of fabric 28 and strip 34 through opening 26. Strip 34 serves primarily to absorb moisture and provide a soft surface on forehead 12.

Figure 3:
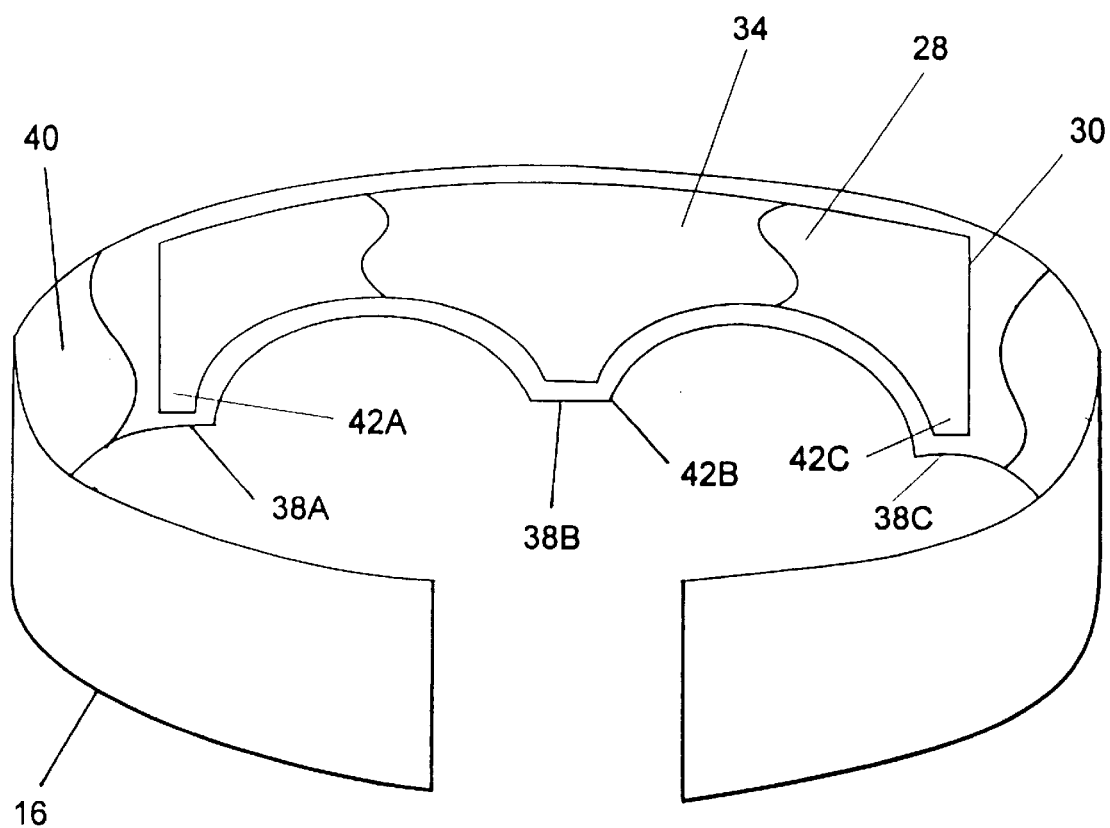
FIG. 3 is a rear perspective of a headband showing a finished section inserted therein.

In FIG. 3, the assembly of band 16 continues. Section 30 is inserted into band 16 between fabric 28 and lining 40 through opening 36. Fabric 28 side of section 30 is proximate lining 40 of band 16. Tabs 42 A, B, C are inserted through openings 38 A, B, C until the edges meet. Section 30 is joined as by sewing to band 16 across openings 38 A, B, C.

Figure 4:
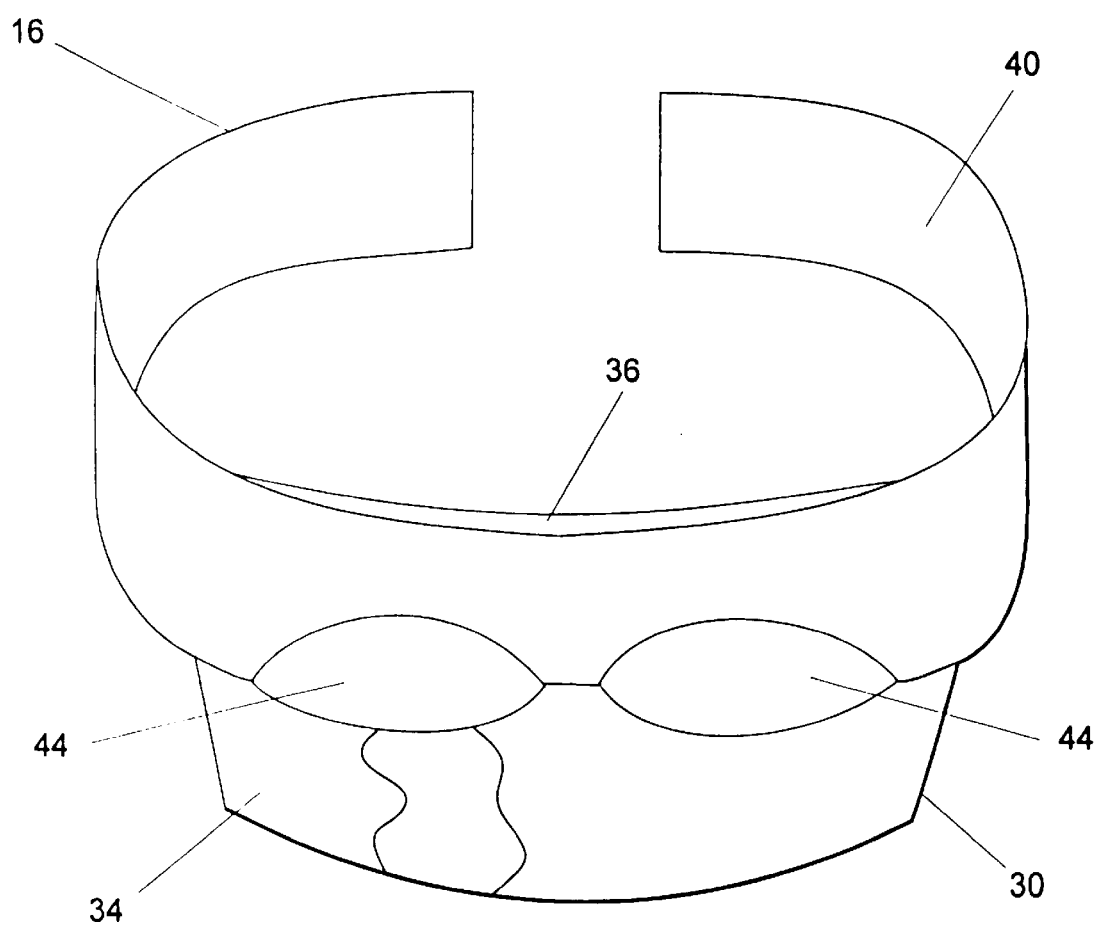
FIG. 4 is a front perspective view of a headband with a section attached and a retainer pocket open.
Figure 5:
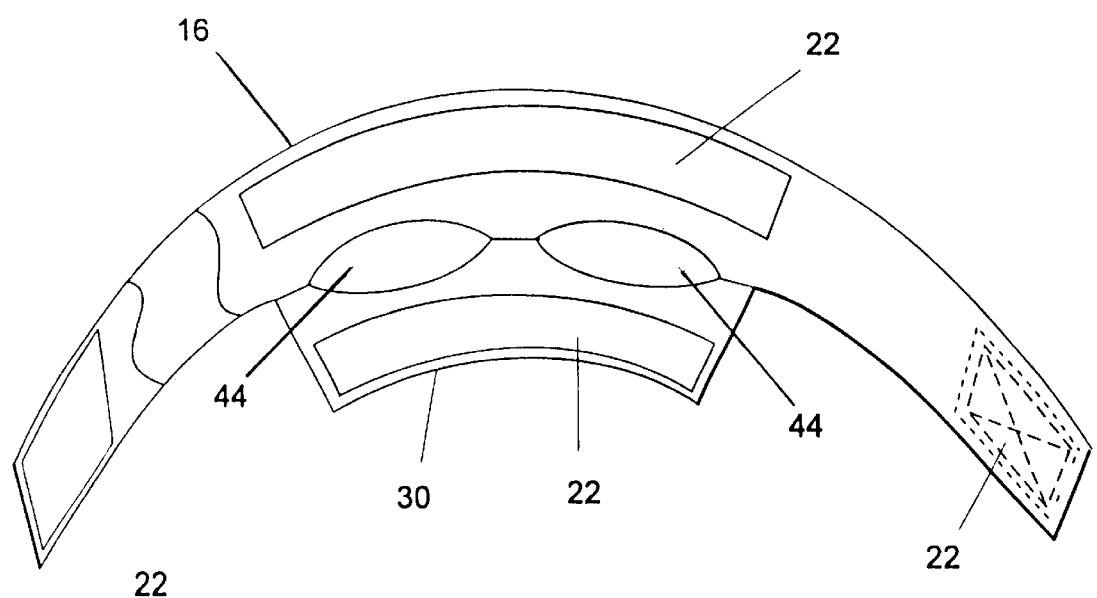
FIG. 5 is a rear perspective view of a headband with a retainer pocket open and two-part releasably cooperating fastener strips attached.

Referring to FIG. 4, the assembled band 16 with section 30 is illustrated. Pulling section 30 through opening 36 brings the right sides of band 16 and lining 40 to the outside. A pair of openings 44 is formed. As illustrated in FIG. 5, elongated strips of a two-part releasably cooperating fastener 22 are attached as by sewing to the inside of band 16 and section 30 above and below openings 44. Opening 26 at the top edge of section 30 and opening 36 at the top edge of band 16 are simultaneously closed. Strips of fastener 22 are attached as by sewing to each end of band 16. This provides adjustability in the tightness or looseness with which the band 16 can be secured to the wearer's head 14.

Figure 6:
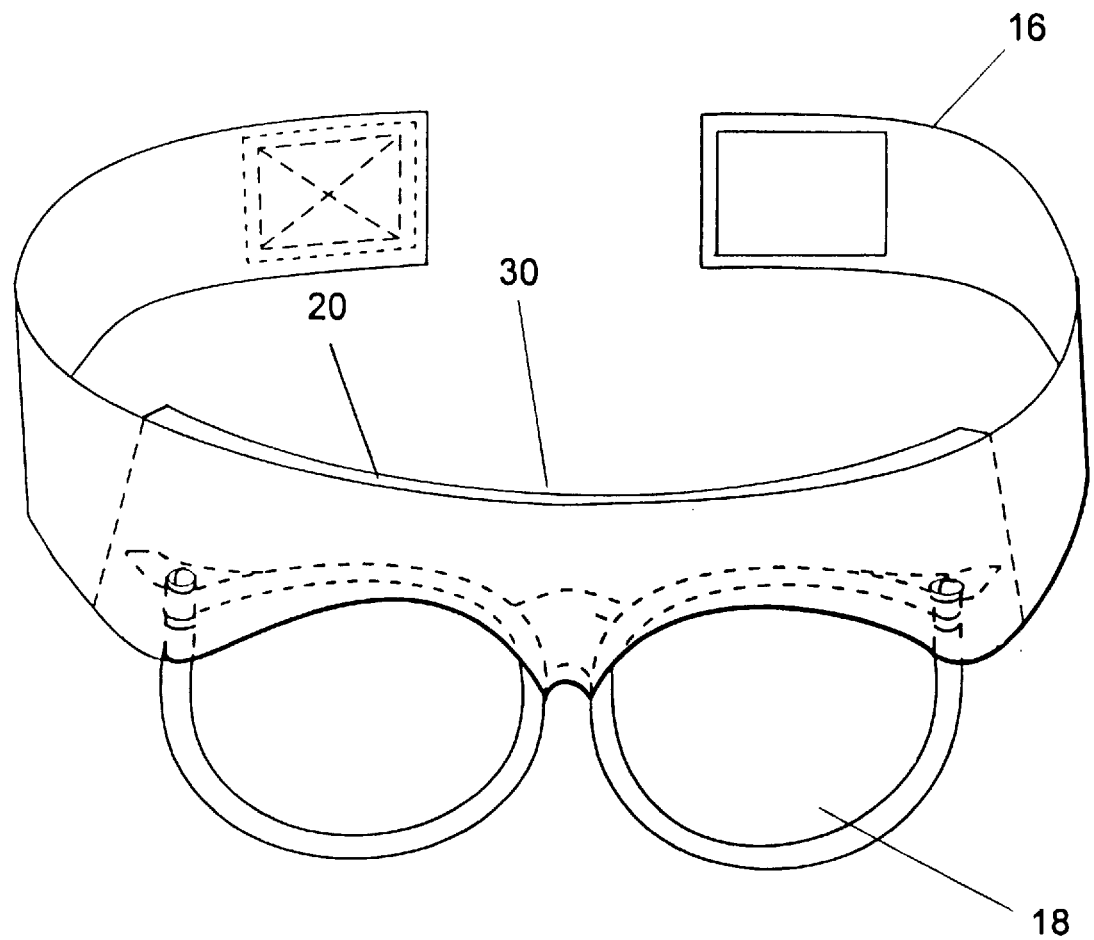
FIG. 6 is a front perspective of a headband with a lens piece inserted in a retainer pocket.

FIG. 6 illustrates band 16 with lens piece 18 inserted into pocket 20. Pocket 20 is formed by folding section 30 upward and detachably retaining it to the inside of band 16 .

Figure 7:
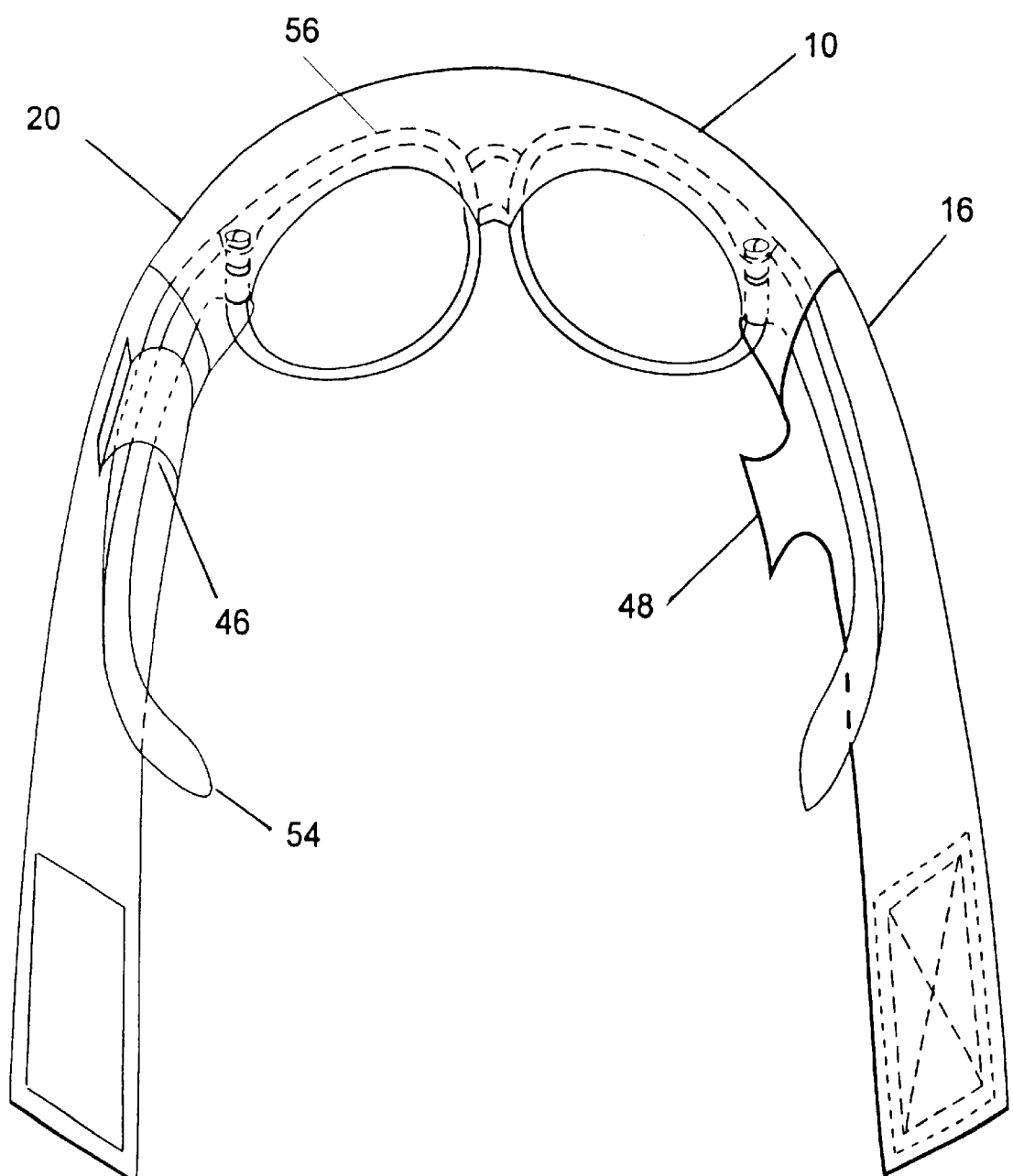
FIG. 7 is a rear perspective of the second embodiment showing conventional eyewear in place with a retainer pocket closed, a temple piece in a tunnel, and an unattached extension.

The second embodiment of the headband 16 as shown in FIG. 7, illustrates the addition of a tunnel 46 for support of each temple piece 54 on conventional eyewear 56. Band 16 is preferably formed as the first embodiment except that each side of band 16 has an extension 48 from the bottom edge of band 16 and lining 40. Lining 40 and band 16 are joined as in FIG. 2. Tunnel 46 is formed by folding each extension 48 upwardly and attaching as by sewing to the inner surface of band 16. The illustration shows article 10 with eyewear 56 positioned in closed pocket 20, temple piece 54 positioned in tunnel 46, and extension 48 in unattached position.

OPERATION—FIGS. 1–7

Headband 16 is constructed so that it is receivable in an encircling relation on the head 14 of the wearer in a position where retainer pocket 20 with lens piece 18 extends across the forehead 12 of the wearer. When section 30 is releasably detached from the inner side of band 16, lens piece 18 is inserted into and through openings 44. Section 30 is folded upward and detachably secured to the inner surface of band 16 forming pocket 20. When band 16 is received on head 14 of the wearer, lens piece 18 extends in front of the eyes of the wearer. In this connection band 16 can be worn as a pair of eyeglasses. Band 16 encircles head 14 of wearer in an adjustable detachably secured manner with fastener 22. Lens piece 18 is readily removable, but once placed within pocket 20, it is securely held in position.

In the second embodiment of the invention, as illustrated in FIG. 7, a tunnel 46 for each temple piece 54 is provided to enable the wearer to use eyewear 56. Each temple piece 54 is inserted through each tunnel 46 and eyewear 56 is inserted into band 16 as described above. Band 16 is readily washed or cleaned when lens piece 18 or eyewear 56 is removed.

CONCLUSION, RAMIFICATIONS, AND SCOPE

Thus the reader will see that the headband with lens piece provides a unique, innovative and improved method of retaining and wearing lens pieces and conventional eyewear within a headband. It allows for easy replacement and interchanging of readily available lens pieces or conventional eyewear without complex and specialized attachments. It can be worn while engaging in a wide variety of activities by persons of any age. While my above description contains many specifications, these should not be construed as limitations on the scope of the invention, but rather as an exemplification of one preferred embodiment thereof. Many other variations are possible. For example, the openings can have shapes including, but not limited to, elliptical, oval, circular and straight depending on the size and shape of the lens piece; lens piece can be hinged to allow folding; lens elements can have ultra violet protection, gradations of tint from dark to light, and transitional tint from indoors to outdoors; construction can be done in diverse fabrics such as terry cloth, fur, leather, suede, sequins, etc.; interlining added between lining and fabric to add body to band; children's sizes; various widths; band closures such as snaps, hook and eye, elastic, etc.; ear attachments for warmth for such activities as skiing, etc.

Accordingly, the scope of my headband with lens piece should be determined not by the embodiments illustrated, but by the appended claims and their legal equivalents.

I claim:

1. A headband comprising
multiple layers of material in at least a portion of the headband,
two or more openings formed in a portion of said multiple layers of material to accommodate lenses near the bottom of the layered portion of the headband,
the bottom of the layered portion of material being joined lateral to and between the openings whereby the lenses may be held in place in the openings and below the headband.

2. A headband according to claim 1 wherein the layered portion forms a pocket for holding the lenses in the openings.

3. A headband comprising multiple layers of material in at least a portion of the headband, two or more openings formed in a portion of said multiple layers of material to accommodate lenses near the bottom of the layered portion of the headband, the bottom of the layered portion of material being joined lateral to and between the openings to form a pocket whereby the lenses may be held in place in the openings and below the headband and wherein the pocket has means for opening on a top side thereof for insertion or removal of the lenses.

4. A headband according to claim 3 wherein the side of the pocket which can be opened has a means for releasable closure.

5. A headband according to claim 4 wherein the means for releasable closure is comprised of a releasably cooperating fastener attached to one or more of the layers of material adjacent the side of the pocket which can be opened.

6. A headband according to claim 3 wherein the pocket is formed by a foldable flap comprised of one or more of the layers of material.

7. A headband according to claim 6 wherein the foldable flap is comprised of a means for releasable attachment to one or more of the other layers of material.

8. A headband according to claim 7 wherein the means for releasable closure is comprised of a releasably cooperating fastener attached to one or more of the layers of material adjacent the side of the pocket which can be opened.

9. A headband according to claim 3 wherein one or more of the layers of material forming the pocket is at least partially detachable from the headband.

10. A headband according to claim 9 wherein the detachable layer is attached to the headband by releasable means.

11. A headband according to claim 10 wherein the releasable means is comprised of a releasably cooperating fastener.

12. A headband according to claim 3 further comprised of means for supporting or accommodating temple pieces of a pair of eyeglasses.

13. A headband according to claim 1 further comprising material configured to cover ears of a wearer of the headband.

14. A combination headband and eye covering comprising multiple layers of material in at least a portion of the headband, two or more openings formed in a portion of said multiple layers of material to accommodate lenses near the bottom of the multiple layer portion of the headband, lenses held in place in said two or more openings and below the headband by the layers of material.

15. A headband and eye covering according to claim 14 further comprising a pair of eyeglasses which provide the lenses.

16. A combination headband and eye covering comprising multiple layers of material in at least a portion of the headband, two or more openings formed in a portion of said multiple layers of material to accommodate lenses near the bottom of the multiple layer portion of the headband, lenses held in place in said two or more openings and below the headband, a pair of eyeglasses which provide the lenses, and means for supporting or accommodating temple pieces of the eyeglasses.

17. A headband and eye covering according to claim 14 wherein the layers of material form a pocket for holding the lenses in the opening.

18. A headband and eye covering according to claim 16 wherein the pocket has means for opening on a top side.

19. A headband and eye covering according to claim 18 wherein the pocket is formed by a foldable flap comprised of one or more of the layers of material.

20. A headband and eye covering according to claim 19 wherein the foldable flap is comprised of a means for releasable attachment to one or more of the other layers of material.

* * * * *